United States Patent [19]

Koo

[11] Patent Number: 4,937,938

[45] Date of Patent: Jul. 3, 1990

[54] EGG SLICERS

[75] Inventor: Vincent H. Koo, Kowloon, Hong Kong

[73] Assignee: IBL Products Company Limited, Hong Kong, Hong Kong

[21] Appl. No.: 413,882

[22] Filed: Sep. 28, 1989

[30] Foreign Application Priority Data

Nov. 11, 1988 [GB] United Kingdom ................. 8826454

[51] Int. Cl.[5] ................................................ A21C 5/00

[52] U.S. Cl. ........................................ 30/117; 30/304

[58] Field of Search ................. 30/116, 117, 232, 304, 30/305, 253, 149, 150

[56] References Cited

U.S. PATENT DOCUMENTS

| | | | |
|---|---|---|---|
| 2,709,298 | 5/1955 | Mayer | 30/117 |
| 3,888,006 | 6/1975 | Roberts | 30/232 X |
| 4,095,339 | 6/1978 | Turner | 30/117 X |
| 4,742,617 | 5/1988 | Gauvry | 30/232 |

FOREIGN PATENT DOCUMENTS

| | | | |
|---|---|---|---|
| 1035159 | 7/1978 | Canada | 30/304 |

*Primary Examiner*—Douglas D. Watts

*Attorney, Agent, or Firm*—Townsend and Townsend

[57] ABSTRACT

An egg slicer comprising upper and lower hinged arm which are arranged to be grasped in one hand by a user. The arms are hinged to one another at their near ends. The front end of the lower arm has a number of spaced but parallel cutter means for slicing a boiled egg forced past them while the upper arm has an enlarged presser member for trapping an egg placed in the cutter means and forcing the egg past the cutter means as the two arms are squeezed together. The upper arm has thumb receiving means for engaging a user's thumb while grasping the arms of the slicer in one hand so that, by raising the user's thumb, the presser member can be raised to allow a fresh egg to be placed in the cutter means, thereby enabling the egg slicer to be operated with one hand.

3 Claims, 2 Drawing Sheets

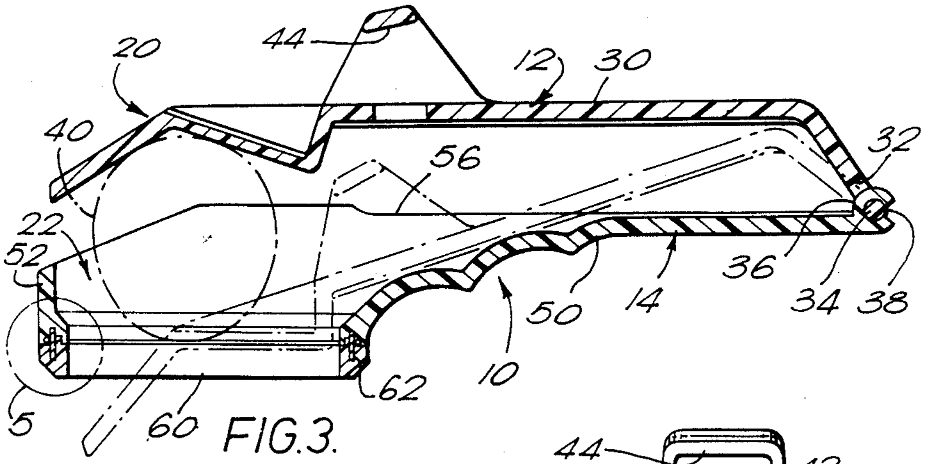
FIG.3.
FIG.4.
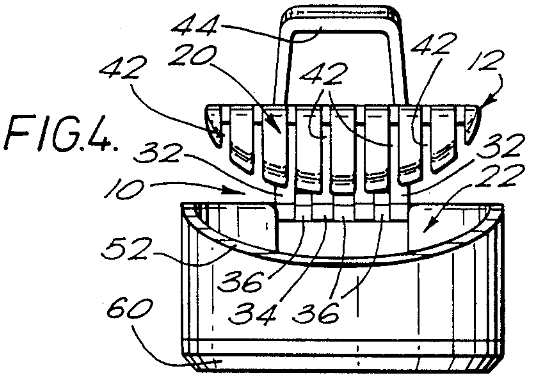
FIG.5.
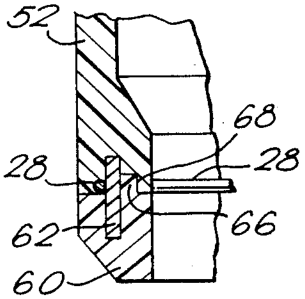
FIG.6.
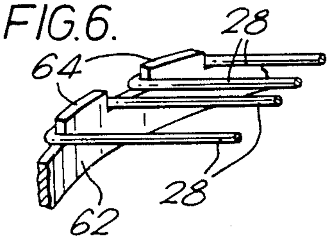

EGG SLICERS

This invention related to improvements is egg slicers.

BACKGROUND TO THE INVENTION

Traditional egg slicers comprise a base on which a boiled egg is placed, the base having a number of spaced parallel slots or recesses to receive cutter means for slicing the egg. The cutter means usually comprises a number of taught spaced strands of wire held by a frame hinged to the base. Thus, as the frame is hinged downwardly, the strands of wire cut the egg into thin slices, the strands of wire being able to pass right through the egg into the slots or recesses in the base.

The sliced egg has to be handled in some way to remove it from the base. This is both unhygenic and unnecessary handling also breaks up the fragile slices.

The invention aims to provide improvements in these respects.

BRIEF SUMMARY OF THE INVENTION

According to the invention there is provided an egg slicer comprising upper and lower hinged arms, the arms having portions extending one over the other and being arranged in use to be grasped in one hand by a user, the arms being hinged to one another at their rear ends, the front end of the lower arm having a number of spaced, parallel cutter means for slicing a boiled egg forced past them, and the upper arm having an enlarged presser member for trapping an egg placed in the cutter means and forcing the egg past the cutter means as the two arms are squeezed together, the upper arm having thumb receiving means for engaging a user's thumb whilst grasping the arms of the slicer in one hand so that, by raising the user's thumb, the presser member can be raised to allow a fresh egg to be placed on the cutter means, thereby enabling the egg slicer to be operated with one hand.

With such a slicer there is the minimum of handling of the egg. Thus, although a fresh egg has to be placed on the lower arm, thereafter the fragile cut slices are forced past the cutter means and can drop directly into a receptacle for use or say directly onto a piece of bread without having to be handled. Also in a slicer according to the invention the egg is forced past the cutter means rather than the cutter means cutting through a stationary egg.

The thumb receiving means are desirably integrally formed in the upper arm. In one simple preferred embodiment, the thumb receiving means include an upstanding loop defining between itself and the top of the upper arm, an opening into and through which the end of the user's thumb can pass so that, upon lifting the thumb, the upper arm can be raised.

According to one preferred embodiment the front end of the lower arm has an enlarged opening and the cutter means comprise a number of parallel but spaced wires stretched across the opening.

BRIEF DESCRIPTION OF THE DRAWINGS

The invention will now be described, by way of example, with reference to the accompanying drawings, in which:

FIG. 3 is an upright section taken along the line 3—3 of FIG. 2;

FIG. 4 is an end view taken in the direction of the arrow 4 of FIG. 1;

FIG. 5 is an enlarged sectional detail of the area circled and marked 5 in FIG. 3; and FIG. 6 is an enlarged perspective detail.

DESCRIPTION OF THE PREFERRED EMBODIMENT

Figure 1:
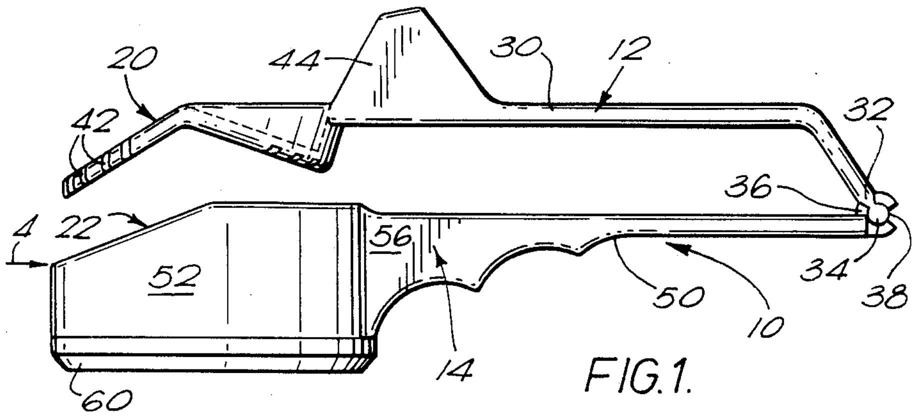
FIG. 1 is a side view of an egg slicer according to the invention.
Figure 2:
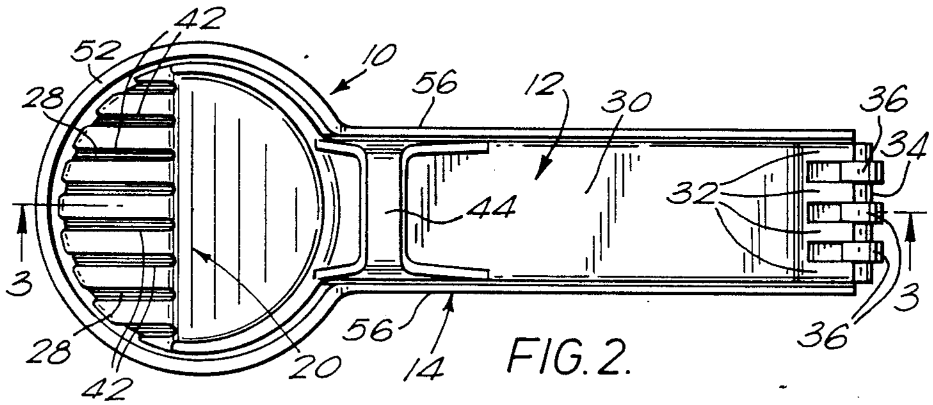
FIG. 2 is a plan view of the egg slicer.

The egg slicer 10 shown in the drawings comprises an upper handle 12 and a lower handle 14. The two handles are hinged to one another about their rear ends as will be described below. At their front ends, the upper and lower handles 12 and 14 have, respectively, an enlarged presser member 20 and an enlarged substantially circular opening 22 across which are a number of taught spaced parallel lengths of wire 28.

The upper handle 12 is moulded from synthetic plastics material. It includes a main portion 30 which is designed to grasped by a user when the slicer is in use. At its rear, the upper handle has a number of integral spaced lugs 32 joined at their ends to a rod-like axle 34. At the rear of the lower handle 14 are a number of integral upstanding hook-like members 36 which are arranged to receive and journal the axle 34. The two handles can therefore pivot about the axle 34 to open and close them. As best seen in FIG. 3, the hook-like members are not complete rings but have openings 38 at the rear. To assemble the two handles, therefore, the handles are orientated at 180° to one another and the axle 34 slid sideways into the members 36 through the opening 38.

The enlarged presser member 20 is integrally formed at the front of the upper handle 12 and is of a generally circular shape as seen in plan view. The underside is in the shape of an inverted "V", the included angle of that "V" being about 150°. In this way an egg 40 (shown in broken lines in FIG. 3) will be trapped by it, the egg being automatically held in the point of the "V".

The presser member 20 has a number of spaced parallel slots 42 in its underside. These slots are positioned to correspond to the lengths of wire 28 so that presser member can push an egg 40 completely past the lengths of wire 28, the presser member and the whole handle 12 being able to move to the position shown in broken lines in FIG. 3.

Upstanding from the top face of the upper handle 12 is an integral loop 44. This is capable of receiving the tip or end of a user's thumb when the user is grasping the handles 12 and 14. In this way the user can raise the upper handle 12 relative the lower handle 14 when it is desired to place a fresh egg 40 in the opening 22.

The lower handle 14 is also moulded from synthetic plastics material and has a main portion 50 which is arranged to be grasped together with the portion 30 which overlies it. The opening 22 is integrally formed at the front end of the portion 30 and comprises a cylindrical upright side wall 52 which is higher at the rear than at the front. To reinforce the join between the wall 52 and the portion 30, upright flanges 56 are integrally formed with the portion 30.

Joined to the lower end of the side wall 52 is a ring 60 of synthetic plastics material. Within the lower end of the side wall and the top of the ring 60 is an upright cylindrical metal ring 62. The top surface of that ring has, as best shown in FIG. 6, integral crenelations 64. To assist in locating the ring 60 when joining this to the lower end of the side wall 52, the ring has an integral upstanding circular ridge 66 which is designed to be received in a corresponding circular recess 68 in the underside of the side wall 52.

To form the lengths of wire 28 extending across the opening 22, a continuous length of stainless steel wire is strung back and forth across the ring 62 around the crenelations as is best shown in FIG. 6. The ends of the wire are then tied off to secure it in place. The ring 62 carrying the lengths of wire 28 is then positioned in the ring 60 and the rings 60 and 62 assembled to the underside of the side wall 52, the ring 60 being permanently joined to the side wall by, for example, ultra sonic welding.

When a boiled egg 40 is to be sliced, the user grasps the portions 30 and 50 of handles 12 and 14 and places the end of his thumb through the loop 44. Then by raising his thumb, the user can raise the upper handle 12 with its integral presser member 20. The egg slicer 10 can be used rather like a pair of tongs. Thus, with the thumb through the loop 44 the user can pick up a peeled boiled egg 40 and placed it in the opening 22 on the lengths of wire 28, and the handles 12 and 14 squeezed together. As a result the egg 40 is forced by the presser member 20 past the wires 28 which cut the egg into thin slices which fall from the open bottom of the opening 22, the upper handle 12 being moved to the broken lines position shown in FIG. 3. If a subsequent egg is to be sliced, the user again raises the handles 12 and places a new boiled egg in the opening 22.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. An egg slicer comprising upper and lower hinged arms, intermediate portions of said arms extending one over the other, and said arms having front ends and rear ends, these said intermediate portions being arranged to be grasped in one hand by a user, the hinge means for hinging said arms to one another at said rear ends, a number of spaced but parallel cutter means at said front end of said lower arm for slicing a boiled egg forced past them, an enlarged presser member at said front end of said upper arm for trapping an egg placed in said cutter means and forcing the egg past said cutter means as the two arms are squeezed together by the user squeezing the arms, thumb receiving means on said upper arm for engaging a user's thumb whilst grasping the arms of the slicer in one hand so that, by raising the user's thumb, the presser member can be raised to allow a fresh egg to be placed in the cutter means, thereby enabling the egg slicer to be operated with one hand.

2. An egg slicer according to claim 1 in which the front end of the lower arm has an enlarged opening and the cutter means comprise a number of parallel but spaced wires stretched across the opening.

3. An egg slicer according to claim 1 in which the thumb receiving means include an upstanding loop defining between itself and the top of the upper arm, an opening into and through which the end of the user's thumb can pass so that, upon lifting the thumb, the upper arm can be raised.

* * * * *